US007471080B2

(12) United States Patent
Sasaki et al.

(10) Patent No.: US 7,471,080 B2
(45) Date of Patent: Dec. 30, 2008

(54) MAGNETIC ABSOLUTE ENCODER

(75) Inventors: Kozo Sasaki, Azumino (JP); Toshiki Maruyama, Azumino (JP); Toshiyuki Abe, Azumino (JP); Muneo Mitamura, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 11/952,159

(22) Filed: Dec. 7, 2007

(65) Prior Publication Data

US 2008/0157705 A1 Jul. 3, 2008

(30) Foreign Application Priority Data

Dec. 28, 2006 (JP) ............................ 2006-355957

(51) Int. Cl.
*G01B 7/30* (2006.01)

(52) U.S. Cl. ................................ 324/207.25; 324/174

(58) Field of Classification Search ......... 324/173–174, 324/207.25; 73/514.31, 514.39; 338/32 R, 338/32 H See application file for complete search history.

(56) References Cited

U.S. PATENT DOCUMENTS

2002/0124663 A1* 9/2002 Tokumoto et al. ...... 73/862.333
2007/0093359 A1* 4/2007 Kobayashi et al. .......... 477/107

FOREIGN PATENT DOCUMENTS

JP 5-233064 A 9/1993

* cited by examiner

*Primary Examiner*—Bot LeDynh
(74) *Attorney, Agent, or Firm*—Buchanan Ingersoll & Rooney PC

(57) ABSTRACT

In the magnetic absolute encoder, an ordinary operating circuit and an ordinary/backup operating circuit are actuated during ordinary operation in which power is supplied from the ordinary operating power supply; the single-rotation absolute value (1) and single-rotation absolute value (2) detected by these circuits are compared by the abnormality diagnosis circuit, and the presence or absence of an abnormality is automatically judged During backup in which the ordinary operating power supply is interrupted, only the low-power-consumption ordinary/backup operating circuit is actuated, and the multiple-rotation value (2) is detected At the point in time at which the system is returned to ordinary operation, the multiple-rotation value setting circuit sets the multiple-rotation value (2) as the multiple-rotation value (1) of the ordinary operating circuit. As a result, the calculation operation of the multiple-rotation value (1) can be restarted.

20 Claims, 3 Drawing Sheets

ORDINARY OPERATING POWER SUPPLY 8
BACKUP POWER SUPPLY 9a,9b
(61,62,63)
(5)
5.0V
4.2V
3.0V
SUPPLY VOLTAGE
t1 t2 t3 t4 t5 t6 t7 t11 t12
A1 A2 B

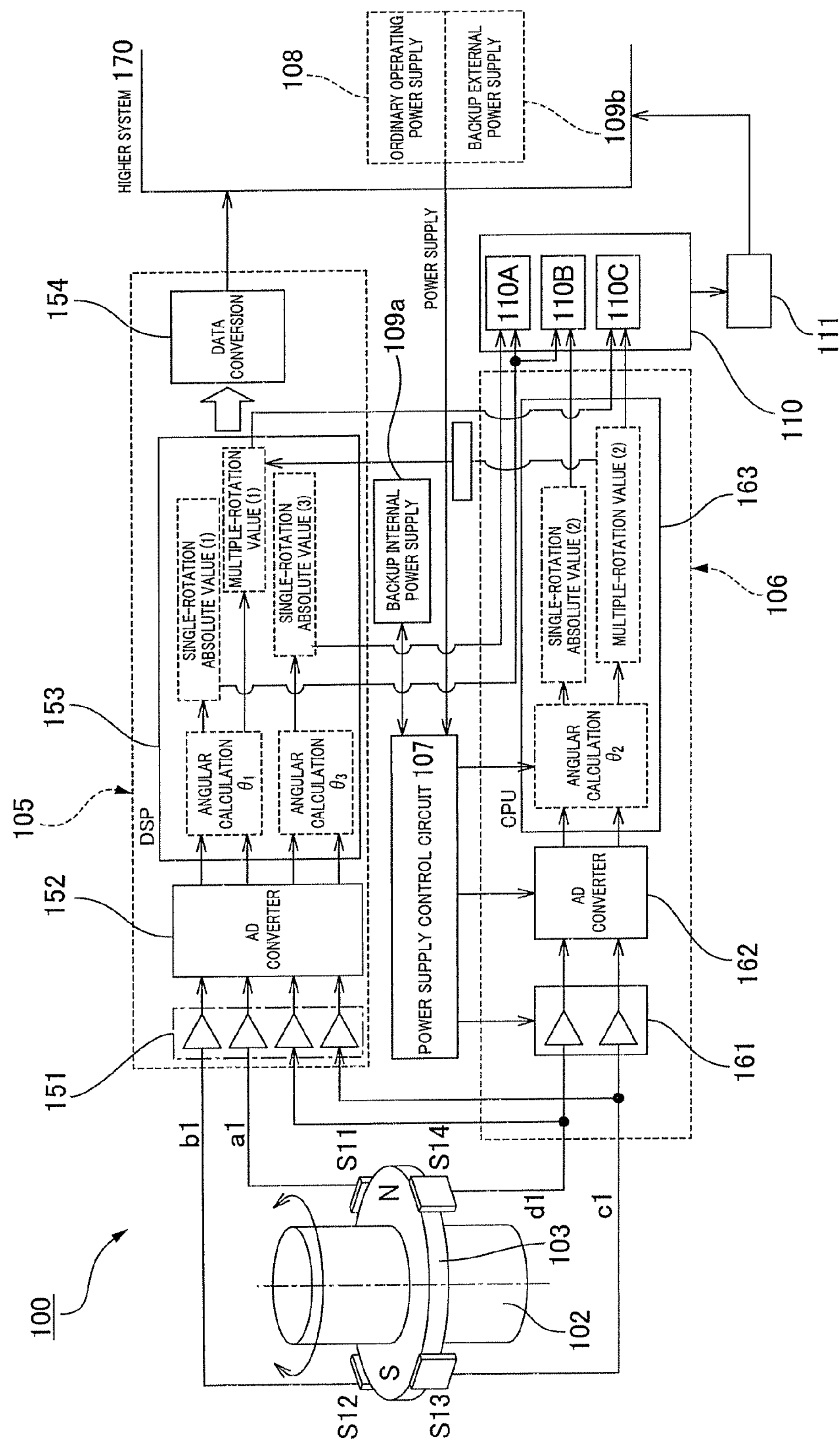
FIG.3
100
HIGHER SYSTEM 170
108
ORDINARY OPERATING POWER SUPPLY
BACKUP EXTERNAL POWER SUPPLY
109b
POWER SUPPLY
154
DATA CONVERSION
109a
110A
110B
110C
111
110
BACKUP INTERNAL POWER SUPPLY
SINGLE-ROTATION ABSOLUTE VALUE (1)
MULTIPLE-ROTATION VALUE (1)
SINGLE-ROTATION ABSOLUTE VALUE (3)
SINGLE-ROTATION ABSOLUTE VALUE (2)
MULTIPLE-ROTATION VALUE (2)
163
106
153
105
DSP
ANGULAR CALCULATION θ1
ANGULAR CALCULATION θ3
POWER SUPPLY CONTROL CIRCUIT 107
CPU
ANGULAR CALCULATION θ2
152
AD CONVERTER
AD CONVERTER
162
151
161
b1
a1
S11
S14
d1
c1
N
S
103
102
S12
S13

MAGNETIC ABSOLUTE ENCODER

This application claims foreign priority based on Japanese Patent application No. 2006- 355957, filed Dec.28, 2006, the content of which is incorporated herein by reference in its entirety.

TECHNICAL FIELD

The present invention relates to a magnetic absolute encoder for detecting the absolute rotational angle and number of rotations of a rotating shaft such as a motor rotating shaft or the like, and more specifically relates to a magnetic absolute encoder comprising a low-power-consumption backup means which is actuated during backup when the main power supply is interrupted.

BACKGROUND ART

Magnetic absolute encoders comprise a multipolar-magnetized rotor or magnetic drum, and a pair of magnetic detection elements. The multipolar-magnetized rotor or magnetic drum is attached in a coaxial configuration to the motor rotating shaft constituting the object of detection. The pair of magnetic detection elements are disposed in angular positions that are spatially separated by 90 degrees so that sine wave signals differing in phase by 90 degrees are output in association with the rotation of the motor rotating shaft. The outputs of the pair of magnetic detection elements are calculated, and the absolute angular position of the motor rotating shaft within one rotation (single-rotation absolute value) and number of rotations of the motor rotating shaft from a predetermined origin (multiple-rotation value) are detected.

Furthermore, the system is constructed so that when the main power supply is interrupted, a switch is made to an internal or external backup power supply so that power is supplied to various parts, thus preventing any interruption of the detection operation even in the case of an emergency such as an interruption of the power supply or the like Since the backup power supply has a limited capacity, the supply of power to various parts is performed intermittently, and the detection operation is backed up with low power consumption.

Here, a high-speed calculation capacity is required in the calculation circuit in order to perform high-precision detection at a high speed, whereas low power consumption is required during backup. High speed and low power consumption are in a trade-off relationship, and it is difficult to satisfy both of these requirements in a single detection system.

From this standpoint, in Patent Document 1, an encoder device is disclosed in which two detection systems are provided, and long-term backup is made possible by actuating a low-power-consumption detection system during backup

[Patent Document 1] JP-A 5-233064

However, in a conventional magnetic absolute encoder equipped with two detection systems, no consideration is given to countermeasures against detection errors occurring in the main detection system which performs high-speed, high-precision detection.

DISCLOSURE OF THE INVENTION

In light of this, it is an object of the present invention to provide a highly reliable magnetic absolute encoder which is devised so that detection errors in the main detection system can be detected using the backup detection system.

In order to solve the abovementioned problem, the magnetic absolute encoder of the present invention comprises:

a magnetic sensor which outputs at least a pair of regular sine wave signals differing in phase by 90 degrees in association with the rotation of the multipolar-magnetized rotor;

main calculation means which detects the output of the magnetic sensor at a first detection period, and which calculates a single-rotation absolute value (1) that expresses the absolute position of the rotor 1 within a single rotation, and a multiple-rotation value (1) that expresses the number of rotations of the rotor from a predetermined origin;

backup calculation means which detects the output of the magnetic sensor at a second detection period which is longer than the first detection period, and which calculates a single-rotation absolute value (2) that expresses the absolute value of the rotor within a single rotation, and a multiple-rotation value (2) that expresses the number of rotations of the rotor from the abovementioned origin;

power supply control means which actuates the main calculation means and the backup calculation means by power supplied from the main power supply, and which actuates only the backup calculation means by power supplied from the backup power supply in cases where the main power supply is interrupted;

and abnormality diagnosis means which compares the single-rotation absolute value (1) and the single-rotation absolute value (2) respectively calculated by the main calculation means and the backup calculation means actuated by power supplied from the main power supply, and which judges that an abnormality has occurred in cases where a state in which the difference between these values is equal to or greater than a predetermined difference continues for a specified number of rotations.

In the present invention, during normal operation, the single-rotation absolute value (1) and multiple-rotation value (1) can be calculated using the main calculation means which can perform a detection operation at high speed and with high precision. During backup, at least the multiple-rotation value (2) can be calculated using the low-power-consumption backup calculation means, and the detection operation can be backed up.

Furthermore, during ordinary operation, the single-rotation absolute value (2) and multiple-rotation value (2) are calculated using the backup calculation means. In the abnormality diagnosis means, the single-rotation absolute value (1) and single-rotation absolute value (2) calculated by the main calculation means and backup calculation means are compared to each other, and the matching of the two detection systems is confirmed. Accordingly, an automatic judgment can be made as to whether or not an abnormality such as trouble or the like has occurred, and the reliability of the absolute magnetic encoder can be heightened.

Here, the abnormality diagnosis means preferably compares the multiple-rotation value (1) and multiple-rotation value (2) respectively calculated by the main calculation means and the backup calculation means actuated by power from the main power supply. By confirming the matching of the multiple-rotation values of both detection systems, it is possible to make an accurate judgment as to whether or not an abnormality such as trouble or the like has occurred.

Next, instead of using the detection output of the magnetic sensor in common in both the main calculation means and backup calculation means, it is also possible to assign an exclusive magnetic sensor to each of these means. Specifically, a first magnetic sensor which outputs a pair of sine wave signals differing in phase by 90 degrees in association with the rotation of the rotor, and a second magnetic sensor which outputs a pair of sine wave signals differing in phase by 90 degrees in association with the rotation of the rotor, may be provided, and the system may be devised so that the main calculation means detects the output of the first magnetic sensor at the abovementioned first detection period, and calculates the single-rotation absolute value (1) and the multiple-rotation value (1), and the backup calculation means detects the output of the second magnetic sensor at the abovementioned second detection period, and calculates the single-rotation absolute value (2) and multiple-rotation value (2).

In this case, the main calculation means may detect the output of the second magnetic sensor at the abovementioned first detection period, and may calculate a single-rotation absolute value (3) that expresses the absolute position of the rotor within one rotation, and the abnormality diagnosis means may compare the single-rotation absolute value (1) and single-rotation absolute value (3) respectively calculated on the basis of the outputs of the first magnetic sensor and the second magnetic sensor.

Instead of this, it would also be possible to provide a third magnetic sensor which outputs sine wave signals differing in phase by 90 degrees in association with the rotation of the rotor, and to devise the system so that the main calculation means detects the output of the third magnetic sensor at the abovementioned first detection period, and calculates a single-rotation absolute value (3) that expresses the absolute position of the rotor within one rotation, and so that the abnormality diagnosis means compares the single-rotation absolute value (1) and the single-rotation absolute value (3) respectively calculated on the basis of the outputs of the first magnetic sensor and the third magnetic sensor.

Next, in cases where the supply of power by the main power supply is restarted, calculation of the single-rotation absolute value (1) is possible in the main calculation means; however, calculation of the interrupted multiple-rotation value is impossible. Accordingly, it is advisable to calculate and store in memory at least the multiple-rotation value (2) while actuated by power supplied from the backup power supply.

Furthermore, at the point in time at which the supply of power from the main power supply is restarted and the main calculation means is returned to an operating state, the multiple-rotation value (2) calculated by the backup calculation means is preferably set as the multiple-rotation value (1) obtained by the main calculation means at this point in time. By setting the multiple-rotation value in the main calculation means, it is possible to immediately restart the calculation operation of the multiple-rotation value by the main calculation means.

Furthermore, the system is preferably configured so that in cases where an abnormality is detected, a report to this effect is output to the higher system. Specifically, the system preferably has a warning means that outputs a warning in cases where it is judged by the abnormality diagnosis means that an abnormality has occurred.

In the magnetic absolute encoder of the present invention, the single-rotation absolute value and multiple-rotation value are calculated by the main calculation means during ordinary operation, and the single-rotation absolute value and multiple-rotation value are also calculated by the backup calculation means. Accordingly, by comparing both calculated values, it is possible to automatically judge whether or not trouble or the like has occurred. Consequently, the reliability of the encoder can be heightened.

BRIEF DESCRIPTION OF THE DRAWINGS

FIG. 3 is a schematic structural diagram of a magnetic absolute encoder according to Embodiment 2 of the present invention.

BEST MODE FOR CARRYING OUT THE INVENTION

Embodiments of a magnetic absolute encoder according to the present invention will be described below with reference to the attached drawings.

Embodiment 1

Figure 1:
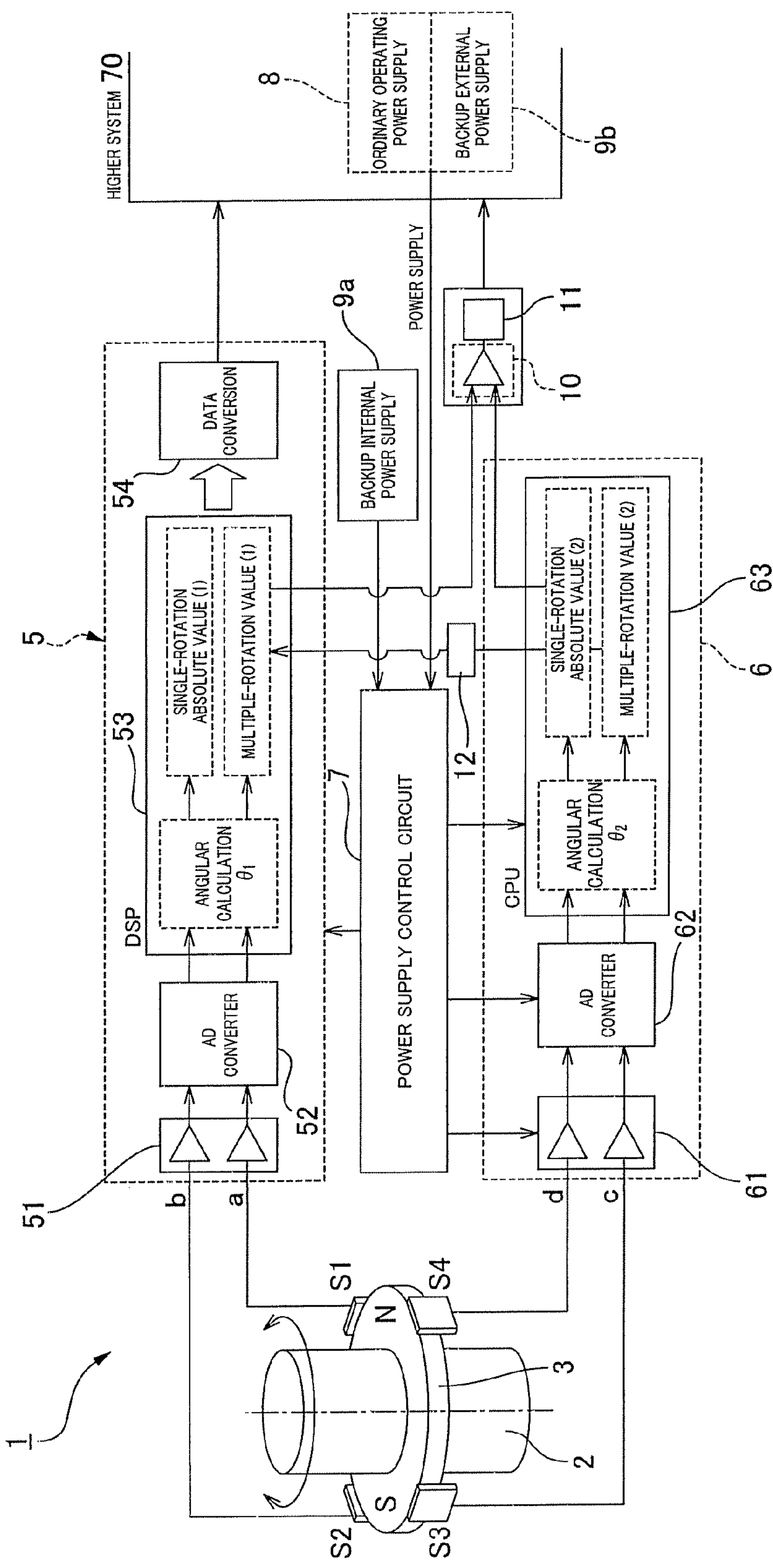
FIG. 1 is a schematic structural diagram of a magnetic absolute encoder according to Embodiment 1 of the present invention.

FIG. 1 is a schematic structural diagram showing a magnetic absolute encoder according to Embodiment 1. The magnetic absolute encoder 1 comprises a circular disk-form rotor 3 which is fastened in a coaxial configuration to a rotating shaft 2 such as a motor rotating shaft or the like. This rotor 3 is a permanent magnet which is bipolar-magnetized at angular intervals of 180 degrees along the circumferential direction. A pair of magnetic detection elements S1 and S2, as well as a pair of magnetic detection elements S3 and S4, are disposed at a fixed gap on the outer circumferential surface of the rotor 3. The pair of magnetic detection elements S1 and S2 are disposed at an angular interval of 90 degrees in the circumferential direction, and output sine wave detection signals a and b differing in phase by 90 degrees in association with the rotation of the rotor 3. Similarly, the other pair of magnetic detection elements S3 and S4 are also disposed at an angular interval of 90 degrees, and output sine wave detection signals c and d differing in phase by 90 degrees in association with the rotation of the rotor 3. Hall elements, MR elements, or the like can be used as magnetic detection elements. A magnetic sensor is constructed by the bipolar-magnetized rotor 3 and the two pairs of magnetic detection elements S1 through S4.

Furthermore, the magnetic absolute encoder 1 comprises an ordinary operating circuit 5 (main calculation means) which calculates the single-rotation absolute value (1) and multiple-rotation value (1) on the basis of the detection signals of the magnetic detection elements S1 and S2, and an ordinary/backup operating circuit 6 (backup calculation means) which calculates the single-rotation absolute value (2) and multiple-rotation value (2) on the basis of the detection signals of the magnetic detection elements S3 and S4.

The ordinary operating circuit 5 comprises an amplifier part 51 which amplifies the detection signals a and b of the magnetic detection elements S1 and S2, an AD converter 52 which converts the amplified detection signals into digital signals, an DSP 53 which calculates the single-rotation absolute value (1) and multiple-rotation value (1) by performing angular calculations using the digitized detection signals, and a data converter 54 which converts the calculated position data (single-rotation absolute value (1) and multiple-rotation value (1)) into serial transmission data. The converted data is transmitted to a higher system 70. In the higher system 70, the rotational position of the rotating shaft 2 can be recognized in an absolute format on the basis of this information.

The ordinary/backup operating circuit 6 is also similarly constructed, and comprises an amplifier part 61 which amplifies the detection signals c and d of the magnetic detection elements S3 and S4, an AD converter 62 which converts the amplified detection signals into digital signals, and a CPU 63 which calculates the single-rotation absolute value (2), position of the origin, and multiple-rotation value (2) by performing angular calculations using the digitized detection signals.

Here, the single-rotation absolute values (1) and (2) are absolute values of the rotating shaft 2 within a single rotation as determined by angular calculations. The multiple-rotation values (1) and (2) are the number of rotations counted from a predetermined origin as determined by angular calculations. The detection signals a through d of the magnetic detection elements S1 through S4 are expressed as shown below, and the single-rotation absolute values (1) and (2) are calculated by angular calculations as the absolute angles θ1 and θ2 as shown below.

$$a=Va\sin(\theta-\alpha)$$

$$b=Vb\cos(\theta-\alpha)$$

$$c=Vc\sin(\theta-\beta)$$

$$d=Vd\cos(\theta-\beta)$$

$$\theta 1=\tan^{-1}((b/Vb)/(a/Va))+\alpha$$

$$\theta 2=\tan^{-1}((d/Vd)/(c/Vc))+\beta$$

Furthermore, the ordinary operating circuit 5 performs calculations at a high speed and with high precision. For example, this circuit samples the detection signals a and b of the magnetic detection elements S1 and S2 at a detection period of 11 μs. The ordinary/backup operating circuit 6 performs calculations at a lower power consumption than the ordinary operating circuit 5, and also has a lower speed and lower precision than the ordinary operating circuit 5 For example, this circuit samples the detection signals c and d of the magnetic detection elements S3 and S4 at a detection period of 2.2 ms.

Next, the magnetic absolute encoder 1 comprises a power supply control circuit 7. During ordinary operation, the power supply control circuit 7 supplies power from the ordinary operating power supply (main power supply) 8 of the higher system 70 to both the ordinary operating circuit 5 and the ordinary/backup operating circuit 6, and actuates these circuits. In cases where the supply of power from the ordinary operating power supply 8 is interrupted, the power supply is switched to the backup power supply (backup internal power supply 9*a* or backup external power supply 9*b*), and power from the backup power supply is provided only to the ordinary/backup operating circuit 6. Accordingly, during backup, only the ordinary/backup operating circuit 6 is actuated, and only the multiple-rotation value (2) is calculated.

Furthermore, the magnetic absolute encoder 1 comprises an abnormality diagnosis circuit 10 which compares the single-rotation absolute value (1) calculated by the ordinary operating circuit 5 and the single-rotation absolute value (2) calculated by the ordinary/backup operating circuit 6 during ordinary operation, and which judges that an abnormality has occurred in cases where a state in which the difference between these values continues for a specified number of rotations, and a warning output circuit 11 which outputs a warning in cases where it is judged by this abnormality diagnosis circuit 10 that an abnormality has occurred. In the abnormality diagnosis circuit 10, for example, both calculated values are compared at a period of 2.2 ms, and it is judged that an abnormality has occurred in cases where it is continuously detected for 10 times that the difference between the two calculated values is in a mismatched state that would cause problems. In this case, a warning is output to the higher system 70 from the warning output circuit 11.

In addition to this, the magnetic absolute encoder 1 comprises a multiple-rotation value setting circuit 12. The multiple-rotation value setting circuit 12 has the function of transmitting the multiple-rotation value (2) backed up in the ordinary/backup operating circuit 6 to the ordinary operating circuit 5 at the point in time at which the supply of power from the ordinary operating power supply 8 is restarted, and the operating state is returned from the backup state to the ordinary operating state, and setting this as the multiple-rotation value (1) at this point in time. Since the ordinary operating circuit 5 does not operate during backup, the multiple-rotation value (1) is lost at the point in time at which the operating state returns from backup to ordinary operation. By setting the multiple-rotation value (2) at the point in time at which the operation returns to ordinary operation, it is possible to restart the subsequent calculation of the multiple-rotation value (1).

Figure 2:
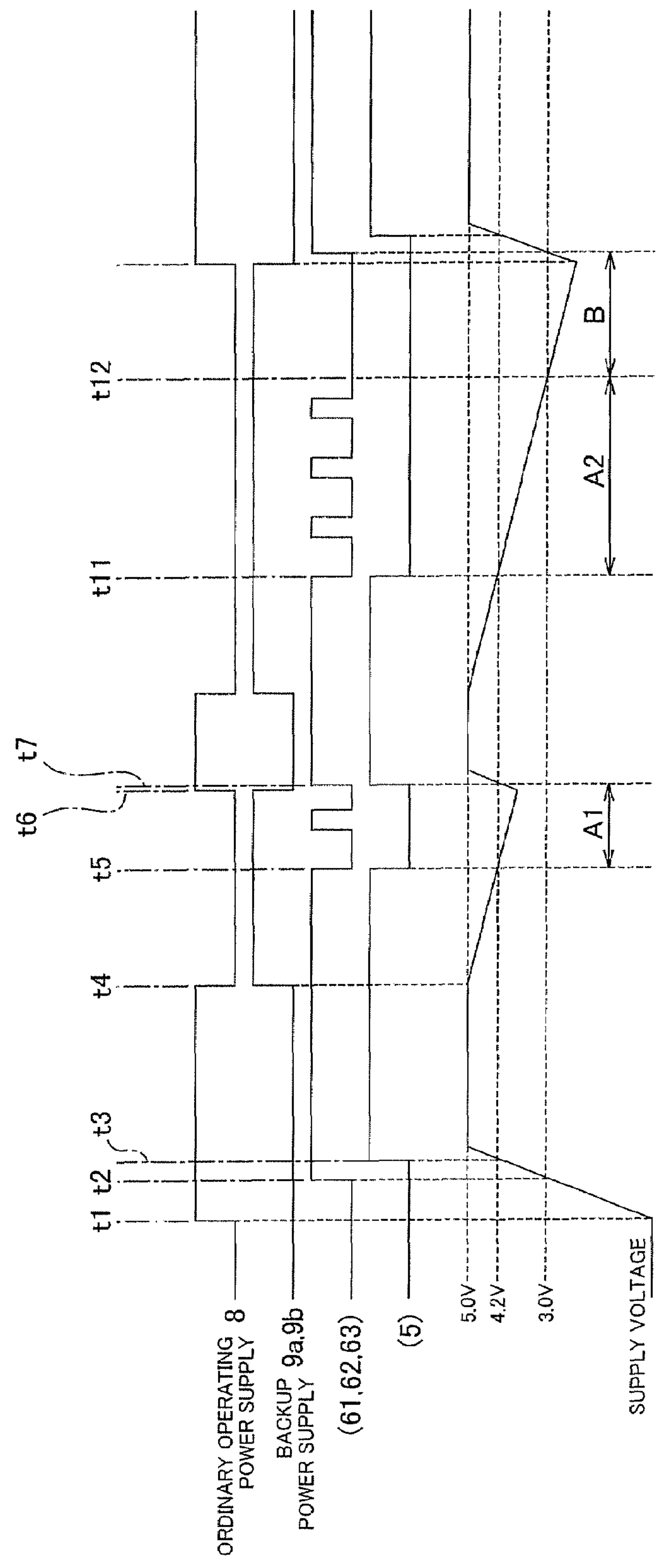
FIG. 2 is a timing chart showing the power supply switching operation of the magnetic absolute encoder shown in FIG. 1.

Next, FIG. 2 is a timing chart showing the power supply control operation performed by the power supply control circuit 7 in the magnetic absolute encoder 1. The power supply switching operation will be described according to this drawing. First, when the ordinary operating power supply is switched on (point in time t1), the supply voltage rises, and for example, when 3.0 V which is the lower limit value of the backup operating voltage is exceeded (point in time t2), power begins to be supplied to the respective parts 61 through 63 of the ordinary/backup operating circuit 6. Then, for example, when the supply voltage exceeds 4.2 V, which is the lower limit value of the ordinary operating voltage (point in time t3), the supply of power to the ordinary operating circuit 5 is started, and the calculation of the single-rotation absolute values (1) and (2) and the multiple-rotation values (1) and (2) is started in both circuits 5 and 6.

Here, when the supply of power from the ordinary operating power supply 8 is interrupted (point in time t4), the power supply is switched to the backup power supply (9*a* or 9*b*). When the supply voltage drops from the operating voltage of 5.0 V and falls below the lower limit value of 4.2 V (point in time t5), the operating state is switched from the ordinary operating state to the backup operating state A1, the supply of power to the ordinary operating circuit 5 is stopped, and a low-power-consumption mode is entered in which power is intermittently supplied to the respective parts 61 through 63 of the ordinary/backup operating circuit 6.

In the backup operating state A1,the following operation is repeated. First, power is supplied to the magnetic detection elements S3 and S4, amplifier 61, AD converter 62, and CPU 63, and after the detection signals have been subjected to an AD conversion, the supply of power to the magnetic detection elements S3 and S4, amplifier 61, and AD converter 62 is stopped. Next, after the angular calculations have been completed, the calculated multiple-rotation value (2) is stored in an internal memory (not shown in the drawings), and the supply of power to the CPU 63 is subsequently stopped. Subsequently, the supply of power to the respective parts is maintained in a stopped state for a fixed period of time.

Next, when the supply of power from the ordinary operating power supply 8 is restarted (point in time t6), at the point in time at which the supply voltage exceeds 4.2 V (point in time t7), the operating state is switched from the backup operating state to the ordinary operating state, and the continuous supply of power to the ordinary operating circuit 5 and ordinary/backup operating circuit 6 is restarted.

In this case, the multiple-rotation value (2) calculated in the ordinary/backup operating circuit 6 is transmitted to the ordinary operating circuit 5 by the multiple-rotation value setting circuit 12, and is reset as the multiple-rotation value (1) of the ordinary operating circuit 5. As a result, the ordinary operating circuit 5 can restart the calculation of the multiple-rotation value (1).

Meanwhile, after the supply of power from the ordinary operating power supply 8 has been interrupted, and the operating state has been switched from the ordinary operating state to the backup operating state (e.g., at the point in time t11), the backup operating state A2 is continued, and when the backup power supply voltage falls below 3.0 V which is the lower limit value of the backup operating voltage (at the point in time t12), a shutdown state B is entered, and the operation of the respective parts is stopped. Subsequently, when the supply of power from ordinary operating power supply 8 is restarted, error information is transmitted to the higher system 100.

Here, in the ordinary operating state, the single-rotation absolute value (1) calculated in the ordinary operating circuit 5 and the single-rotation absolute value (2) calculated in the ordinary/backup operating circuit 6 are compared in the abnormality diagnosis circuit 10, for example, every 2.2 ms, which is the calculation timing of the single-rotation absolute value (2). In cases where the difference between these values is such that a large difference that would cause problems in control is continuously generated for 10 times, it is judged that an abnormality has occurred. Furthermore, a warning indicating that an abnormality has occurred is output to the higher system 100 from the warning generating circuit 11. It can be ascertained from this warning that an abnormality has occurred in the magnetic absolute encoder 1.

In the magnetic absolute encoder 1, as was described above, a rotating shaft absolute value detector is constructed using two pairs of magnetic detection elements S1 through S4. Ordinary operation in which detection is performed at a high speed and with a high reliability is handled by the ordinary operating circuit 5 using the detection outputs of the magnetic detection elements S1 and S2, and ordinary operation and backup operation are handled at a low power consumption by the ordinary/backup operating circuit 6 using the detection outputs of the magnetic detection elements S3 and S4. As a result, high reliability during ordinary operation and low power consumption during backup can be realized.

Furthermore, during ordinary operation, the single-rotation absolute value (1) and single-rotation absolute value (2) are compared in the abnormality diagnosis circuit 10, and the matching of these values is confirmed. Accordingly, the detection of abnormalities can be accomplished by the encoder itself, which is effective in improving the reliability of the encoder.

Furthermore, in the present example, two pairs of magnetic detection elements are used; however, it would also be possible to install only one pair of magnetic detection elements, and to supply the detection outputs of these elements to the ordinary operating circuit 5 and ordinary/backup operating circuit 6.

Embodiment 2

FIG. 3 is a schematic structural diagram showing a magnetic absolute encoder according to Embodiment 2. The magnetic absolute encoder 100 comprises a circular disk-form rotor 103 which is fastened in a coaxial configuration to a rotating shaft 102 such as a motor rotating shaft or the like. This rotor 103 is a permanent magnet which is bipolar-magnetized at angular intervals of 180 degrees along the circumferential direction. A pair of magnetic detection elements S11 and S12, as well as a pair of magnetic detection elements S13 and S14, are disposed at a fixed gap on the outer circumferential surface of the rotor 103. The pair of magnetic detection elements S11 and S12 are disposed at an angular interval of 90 degrees in the circumferential direction, and output sine wave detection signals a1 and b1 differing in phase by 90 degrees in association with the rotation of the rotor 103. Similarly, the other pair of magnetic detection elements S13 and S14 are also disposed at an angular interval of 90 degrees, and output sine wave detection signals c1 and d1 differing in phase by 90 degrees in association with the rotation of the rotor 103. Hall elements, MR elements, or the like can be used as magnetic detection elements. A magnetic sensor is constructed by the bipolar-magnetized rotor 103 and the two pairs of magnetic detection elements S11 through S14.

Furthermore, the magnetic absolute encoder 100 comprises an ordinary operating circuit 105 (main calculation circuit) and an ordinary/backup operating circuit 106 (backup calculation means). The ordinary operating circuit 105 calculates the single-rotation absolute value (1) and multiple-rotation value (1) on the basis of the detection signals of magnetic detection elements S11 and S12. Furthermore, the single-rotation absolute value (3) is calculated on the basis of the detection signals of the magnetic detection elements S13 and S14. Meanwhile, the ordinary/backup operating circuit 106 calculates the single-rotation absolute value (2) and multiple-rotation value (2) on the basis of the detection signals of the magnetic detection elements S13 and S14.

The ordinary operating circuit 105 comprises an amplifier part 151 which amplifies the detection signals al through d1 of the magnetic detection elements S11 through S14, an AD converter 152 which converts the amplified detection signals into digital signals, a DSP 153 which calculates the single-rotation absolute value (1) and multiple-rotation value (1) by performing angular calculations using the digitized detection signals, and a data converter 154 which converts the calculated position data (single-rotation absolute value (1) and multiple-rotation value (1)) into serial transmission data. The converted data is transmitted to the higher system 170. The rotational position of the rotating shaft 102 can be confirmed in an absolute format on the basis this information.

The ordinary/backup operating circuit 106 is also constructed in a similar manner, and comprises an amplifier part 161 which amplifies the detection signals c1 and d1 of the magnetic detection elements S13 and S14, an AD converter 162 which converts the amplified detection signals into digital signals, and a CPU 163 which calculates the single-rotation absolute value (2), position of the origin, and multiple-rotation value (2) by performing angular calculations using the digitized detection signals.

Here, the single-rotation absolute values (1), (2) and (3) are absolute values of the rotating shaft 102 within a single rotation as determined by angular calculations. The multiple-rotation values (1) and (2) are the number of rotations counted from a predetermined origin as determined by angular calculations. The detection signals a1 through d1 of the magnetic detection elements S11 through S14 are expressed as shown below, and the single-rotation absolute values (1), (2) and (3) are calculated by angular calculations as the absolute angles θ1, θ2 and θ3 as shown below.

$$a1 = Va1\,\sin(\theta-\alpha)$$

$$b1 = Vb1\,\cos(\theta-\alpha)$$

$$c1=Vc1\sin(\theta-\beta)$$

$$d1=Vd\cos(\theta-\beta)$$

$$\theta1=\tan^{-1}((b1/Vb)/(a1\,Va))+\alpha$$

$$\theta2=\theta3=\tan^{-1}((d1/Vd)/(c1/Vc))+\beta$$

Furthermore, the ordinary operating circuit 105 performs calculations at a high speed and with high precision. For example, this circuit samples the detection signals a1 and b1 of the magnetic detection elements S11 through S14 at a detection period of 11 μs. The ordinary/backup operating circuit 106 performs calculations at a lower power consumption than the ordinary operating circuit 105, and also has a lower speed and lower precision than the ordinary operating circuit 105. For example, this circuit samples the detection signals c1 and d1 of the magnetic detection elements S13 and S14 at a detection period of 2.2 ms.

Next, the magnetic absolute encoder 100 comprises a power supply control circuit 107. During ordinary operation, the power supply control circuit 107 supplies power from the ordinary operating power supply (main power supply) 108 of the higher system 170 to both the ordinary operating circuit 105 and the ordinary/backup operating circuit 106, and actuates these circuits. In cases where the supply of power from the ordinary operating power supply 108 is interrupted, the power supply is switched to the backup power supply (backup internal power supply 109*a* or backup external power supply 109*b*), and power from the backup power supply is provided only to the ordinary/backup operating circuit 106. Accordingly, during backup, only the ordinary/backup operating circuit 106 is actuated, and only the multiple-rotation value (2) is calculated.

Furthermore, the magnetic absolute encoder 100 comprises an abnormality diagnosis circuit 110 which automatically judges whether or not a detection error has occurred in ordinary operation, and a warning output circuit 111 which outputs a warning indicating that an abnormality has occurred. The warning is transmitted to the higher system 170.

The abnormality diagnosis circuit 110 comprises a first abnormality diagnosis part 110A which compares the single-rotation absolute value (1) and single-rotation absolute value (3) calculated by the ordinary operating circuit 105, and which judges that an abnormality has occurred in cases where a state in which the difference between these values is equal to or greater than a predetermined difference continues for a specified number of rotations (e.g., 10 rotations). Furthermore, the abnormality diagnosis circuit 110 comprises a second abnormality diagnosis circuit 110B which compares the single-rotation absolute value (1) calculated by the ordinary operating circuit 105 and the single-rotation absolute value (2) calculated by the ordinary/backup operating circuit 106, and which judges that an abnormality has occurred in cases where a state in which the difference between these values is equal to or greater than a predetermined difference continues for a specified number of rotations m (e.g., 10 rotations). Furthermore, the abnormality diagnosis circuit 110 comprises a third abnormality diagnosis circuit 110C which compares the multiple-rotation value (1) calculated by the ordinary operating circuit 105 and the multiple-rotation value (2) calculated by the ordinary/backup operating circuit 106, and which judges that an abnormality has occurred in cases where a state in which the difference between these values is equal to or greater than a predetermined difference continues for a specified number of rotations (e.g., 10 rotations).

In the first abnormality diagnosis circuit 110A, both calculated values are compared at the same operating speed as in the ordinary operating circuit 105, e.g., at a period of 11 μs. It is judged that an abnormality has occurred in cases where it is continuously detected for 10 rotations that the difference between the two calculated values is in a mismatched state that would cause problems in terms of control. In the second abnormality diagnosis circuit 110B and third abnormality diagnosis circuit 110C, both calculated values are compared at a period that is the same as the operating speed of the of the ordinary/backup operating circuit 106, e.g., a period of 2.2 ms, and it is judged that an abnormality has occurred in cases where it is continuously detected for 10 rotations that the difference between the two calculated values is in a mismatched state that would cause problems in terms of control. In cases where an abnormality is detected in either of the abnormality diagnosis circuits, a warning is output from the warning output circuit 111.

Furthermore, the third abnormality diagnosis circuit 110C constantly performs comparisons (detects abnormalities) during ordinary operation after the power supply has been switched on. In the first and second abnormality diagnosis circuits 110A and 110B, operation is not performed in a state in which the absolute rotational position of the rotor 102 is unstable, as in the first rotation after the power supply is switched on and the like.

In addition to this, the magnetic absolute encoder 100 comprises a multiple-rotation value setting circuit 112. The multiple-rotation value setting circuit 112 has the function of transmitting the multiple-rotation value (2) backed up in the ordinary/backup operating circuit 6 to the ordinary operating circuit 105 at the point in time at which the supply of power from the ordinary operating power supply 108 is restarted, and the operating state is returned from the backup state to the ordinary operating state, and setting this as the multiple-rotation value (1) at this point in time. Since the ordinary operating circuit 105 does not operate during backup, the multiple-rotation value (1) is lost at the point in time at which the operating state returns from backup to ordinary operation. By setting the multiple-rotation value (2) at the point in time at which the operation returns to ordinary operation, it is possible to restart the subsequent calculation of the multiple-rotation value (1).

The power supply switching control operation performed by the power supply control circuit 107 in the magnetic absolute encoder 100 constructed in this manner is similar to that of the magnetic absolute encoder 1 according to Embodiment 1 shown in FIG. 2; accordingly, a description will be omitted.

In the magnetic absolute encoder 100, as was described above, a rotating shaft absolute value detector is constructed using two pairs of magnetic detection elements S11 through S14, and ordinary operation in which detection is performed at a high speed and with high precision is handled by the ordinary operating circuit 105 using the detection outputs of the magnetic detection elements S11 and S12. Furthermore, ordinary operation and backup operation are handled at a low power consumption by the ordinary/backup operating circuit 106 using the detection outputs of the magnetic detection elements S13 and S14. As a result, high speed during ordinary operation and low power consumption during backup operation can be realized.

Furthermore, during ordinary operation, the single-rotation absolute value (1) and single-rotation absolute value (3) can be calculated at a high speed and with high precision, and matching can be confirmed by comparing these values, in the abnormality diagnosis circuit 110A. Accordingly, errors can be instantly detected, and reliability at small rotational angles can be obtained. In the case of an AC servo motor, when the amount of deviation from ideal phase excitation is large, the problem of an inability to generate torque arises. In the present example, however, since errors can be instantly detected, abnormalities can be detected before it becomes impossible to generate torque, and safety can also be improved.

Furthermore, during ordinary operation, the speed is low in the abnormality diagnosis circuit 110B and abnormality diagnosis circuit 110C; however, the comparison of the single-rotation absolute value (1) and single-rotation absolute value (2) calculated by different angle calculation systems, and the comparison of the multiple-rotation value (1) and multiple-rotation value (2), are performed, and the matching is confirmed. Accordingly, error detection can be made redundant, and reliability and safety can be heightened.

Furthermore, two pairs of magnetic detection elements are used in the present example; however, it would also be possible to install a pair of magnetic detection elements exclusively for use in calculating the single-rotation absolute value (3), and to use a total of three pairs of magnetic detection elements.

The invention claimed is:

1. A magnetic absolute encoder comprising:

a magnetic sensor which outputs at least a pair of sine wave signals differing in phase by 90 degrees in association with the rotation of a multipolar-magnetized rotor;

main calculation means which detects the output of the magnetic sensor at a first detection period, and which calculates a single-rotation absolute value (1) that expresses the absolute position within one rotation of the rotor, and a multiple-rotation value (1) that expresses the number of rotations of the rotor from a preset origin;

backup calculation means which detects the output of the magnetic sensor at a second detection period that is longer than the first detection period, and which calculates a single-rotation absolute value (2) that expresses the absolute position within one rotation of the rotor, and a multiple-rotation value (2) that expresses the number of rotations of the rotor from the origin;

power supply control means which controls to drive the main calculation means and the backup calculation means using power supplied from a main power supply, and which controls to drive only the backup calculation means using power supplied from a backup power supply in cases where the main power supply is interrupted; and an abnormality diagnosis means which compares the single-rotation absolute value (1) and single-rotation absolute value (2) respectively calculated by the main calculation means and the backup calculation means actuated by power from the main power supply, and which judges that an abnormality has occurred in cases where a state in which the difference between these values is equal to or greater than a predetermined difference continues for a specified number of rotations.

2. The magnetic absolute encoder according to claim 1, wherein the abnormality diagnosis means compares the multiple-rotation value (1) and the multiple-rotation value (2) respectively calculated by the main calculation means and the backup calculation means actuated by power from the main power supply, and which judges that an abnormality has occurred in cases where a state in which the difference between these values is equal to or greater than a predetermined difference continues for a specified number of rotations.

3. The magnetic absolute encoder according to claim 1, wherein the magnetic sensor comprises a first magnetic sensor that outputs a pair of sine wave signals differing in phase by 90 degrees in association with the rotation of the rotor, and a second magnetic sensor that outputs a pair of sine wave signals differing in phase by 90 degrees in association with the rotation of the rotor;

the main calculation means detects the output of the first magnetic sensor at the first detection period, and calculates the single-rotation absolute value (1) and the multiple-rotation value (1), and the backup calculation means detects the output of the second magnetic sensor at the second detection period, and calculates the single-rotation absolute value (2) and the multiple-rotation value (2).

4. The magnetic absolute encoder according to claim 3, wherein the main calculation means detects the output of the second magnetic sensor at the first detection period, and calculates a single-rotation absolute value (3) that expresses the absolute position within one rotation of the rotor, and the abnormality diagnosis means compares the single-rotation absolute value (1) and the single-rotation absolute value (3) respectively calculated on the basis of the outputs of the first magnetic sensor and second magnetic sensor, and judges that an abnormality has occurred in cases where a state in which the difference between these values is equal to or greater than a predetermined difference continues for a specified number of rotations.

5. The magnetic absolute encoder according to claim 3, wherein the magnetic sensor comprises a third magnetic sensor which outputs a pair of sine wave signals differing in phase by 90 degrees in association with the rotation of the rotor, the main calculation means detects the output of the third magnetic sensor at the first detection period, and calculates a single-rotation absolute value (3) that expresses the absolute position within one rotation of the rotor, and the abnormality diagnosis means compares the single-rotation absolute value (1) and the single-rotation absolute value (3) respectively calculated on the basis of the outputs of the first magnetic sensor and the third magnetic sensor, and judges that an abnormality has occurred in cases where a state in which the difference between these values is equal to or greater than a predetermined difference continues for a specified number of rotations.

6. The magnetic absolute encoder according to claim 1, wherein the backup calculation means calculates only the multiple-rotation value (2) and stores this value in memory while actuated by power supplied from the backup power supply.

7. The magnetic absolute encoder according to claim 1, further comprising multiple-rotation value setting means which, at the point in time at which the supply of power from the main power supply is restarted and the main calculation means returns to an operating state, sets the multiple-rotation value (2) calculated by the backup calculation means as the multiple-rotation value (1) obtained by the main calculation means at this point in time.

8. The magnetic absolute encoder according to claim 1, further comprising warning means which outputs a warning in cases where the abnormality diagnosis means has judged that an abnormality has occurred.

9. The magnetic absolute encoder according to claim 2, wherein the backup calculation means calculates only the multiple-rotation value (2) and stores this value in memory while actuated by power supplied from the backup power supply.

10. The magnetic absolute encoder according to claim 3, wherein the backup calculation means calculates only the multiple-rotation value (2) and stores this value in memory while actuated by power supplied from the backup power supply.

11. The magnetic absolute encoder according to claim 4, wherein the backup calculation means calculates only the multiple-rotation value (2) and stores this value in memory while actuated by power supplied from the backup power supply.

12. The magnetic absolute encoder according to claim 5, wherein the backup calculation means calculates only the multiple-rotation value (2) and stores this value in memory while actuated by power supplied from the backup power supply.

13. The magnetic absolute encoder according to claim 2, further comprising multiple-rotation value setting means which, at the point in time at which the supply of power from the main power supply is restarted and the main calculation means returns to an operating state, sets the multiple-rotation value (2) calculated by the backup calculation means as the multiple-rotation value (1) obtained by the main calculation means at this point in time.

14. The magnetic absolute encoder according to claim 3, further comprising multiple-rotation value setting means which, at the point in time at which the supply of power from the main power supply is restarted and the main calculation means returns to an operating state, sets the multiple-rotation value (2) calculated by the backup calculation means as the multiple-rotation value (1) obtained by the main calculation means at this point in time.

15. The magnetic absolute encoder according to claim 4, further comprising multiple-rotation value setting means which, at the point in time at which the supply of power from the main power supply is restarted and the main calculation means returns to an operating state, sets the multiple-rotation value (2) calculated by the backup calculation means as the multiple-rotation value (1) obtained by the main calculation means at this point in time.

16. The magnetic absolute encoder according to claim 5, further comprising multiple-rotation value setting means which, at the point in time at which the supply of power from the main power supply is restarted and the main calculation means returns to an operating state, sets the multiple-rotation value (2) calculated by the backup calculation means as the multiple-rotation value (1) obtained by the main calculation means at this point in time.

17. The magnetic absolute encoder according to claim 2, further comprising warning means which outputs a warning in cases where the abnormality diagnosis means has judged that an abnormality has occurred.

18. The magnetic absolute encoder according to claim 3, further comprising warning means which outputs a warning in cases where the abnormality diagnosis means has judged that an abnormality has occurred.

19. The magnetic absolute encoder according to claim 4, further comprising warning means which outputs a warning in cases where the abnormality diagnosis means has judged that an abnormality has occurred.

20. The magnetic absolute encoder according to claim 5, further comprising warning means which outputs a warning in cases where the abnormality diagnosis means has judged that an abnormality has occurred.

* * * * *